United States Patent [19]

Hinson

[11] Patent Number: 5,428,401
[45] Date of Patent: Jun. 27, 1995

[54] IMPROVEMENTS IN OR RELATING TO VIDEO IMAGE KEYING SYSTEMS AND METHODS

[75] Inventor: Neil R. Hinson, Newbury, England

[73] Assignee: Quantel Limited, Newbury, England

[21] Appl. No.: 880,236

[22] Filed: May 8, 1992

[30] Foreign Application Priority Data

May 9, 1991 [GB] United Kingdom ............... 9109999

[51] Int. Cl.⁶ ............................................. H04N 9/74
[52] U.S. Cl. .................................. 348/586; 348/587; 348/590; 348/593; 348/598
[58] Field of Search .................. 358/220, 183, 22 PIP, 358/22 CK, 22 C; H04N 9/74, 5/272; 348/348, 584, 586, 587, 590, 591, 592, 593, 594, 595, 598, 599

[56] References Cited

U.S. PATENT DOCUMENTS

| | | | |
|---|---|---|---|
| 4,488,169 | 12/1984 | Yamamoto | 358/22 |
| 4,496,966 | 11/1985 | Hausdörfer et al. | 358/22 |
| 4,851,912 | 7/1989 | Jackson et al. | 358/183 |
| 4,853,784 | 8/1989 | Abt et al. | 358/22 |
| 4,947,254 | 8/1990 | Abt et al. | 358/22 |
| 4,970,595 | 11/1990 | Bloomfield | 358/22 |
| 4,991,014 | 2/1991 | Takahashi et al. | 358/183 |
| 5,040,066 | 8/1991 | Arbeiter et al. | 358/22 |
| 5,070,397 | 12/1991 | Wedobrburn-Bishop | 358/22 |
| 5,115,314 | 5/1992 | Ross et al. | 358/183 |

FOREIGN PATENT DOCUMENTS

| | | | |
|---|---|---|---|
| 0074824 | 2/1983 | European Pat. Off. | H04N 9/539 |
| 0160549 | 11/1985 | European Pat. Off. | H04N 5/265 |
| 2059219 | 4/1981 | United Kingdom | H04N 9/539 |
| 2158318 | 11/1985 | United Kingdom | H04N 5/262 |
| 8606234 | 10/1986 | WIPO | H04N 5/265 |

*Primary Examiner*—James J. Groody
*Assistant Examiner*—Sherrie Hsia
*Attorney, Agent, or Firm*—Cooper & Dunham

[57] ABSTRACT

An image processing system operates on first and second image data (V and Bg) to produce data defining a combined image. The first image data (V) represents a keyed image comprising a first object (F) keyed over a portion of a first background (B) in accordance with keying data (K). The second image data (Bg) represents a background. The system is arranged so that the second image data (Bg) is weighted by respective control data (α) related to said keying data (K) before being combined with the first image data (V). In another embodiment the first image data represents a second object independently keyed over the keyed image in accordance with second keying data and the control data is further related to the second keying data. In a further embodiment the first image data represents an image derived by cross fading between the first keyed image and a second keyed image.

41 Claims, 5 Drawing Sheets

IMPROVEMENTS IN OR RELATING TO VIDEO IMAGE KEYING SYSTEMS AND METHODS

BACKGROUND OF THE INVENTION

This invention relates to video image keying systems and methods.

Keying systems are widely used for picture editing and composition in television and are used to key a foreground image into a background image, For example a keying system may be used for keying letters or other characters forming a caption into a picture to provide information relating to the subject matter of the picture. In such a case video signals representing the characters, as selected by the operator, are generated by a source such as a character generator, for example the character generator sold by the assignee hereof Quantel, Ltd. of Newbury, England under the trade mark "CYPHER". When a character is selected, the generator not only provides the video signals representing the character which may be regarded as foreground signals F, but it also provides internal control signals K which are used to key the character or foreground video signals over other video signals representing a background matte B. Normally the background matte B is a uniform black. The resulting combined signal is output from the source for further processing by other television image apparatus. The control signals K are also used within the source to key video signals representing white (value 1) over video signals representing black (value 0) to produce a key signal α which is output from the source for external use together with the combined signal. Thus, the output of the character generator comprises the video signal representation V of the foreground F keyed over the background B together with the external key. The external key α is used subsequently in external circuitry as will be described in greater detail hereinafter.

At present it is usual to perform the keying of the foreground F over the background matte B within the source character generator using a linear interpolating circuit in which the internal control signals K function as an interpolating coefficient. The video V which is the result of the interpolation can then be represented by $$V = F \cdot K + B(1-K) \quad (1)$$

It is also usual for the control signals K to have a maximum value, which may be 1 or less than 1, for pixels lying within the character represented by the video signals F and to have value 0 for pixels within the background matte B, except for a zone round the boundary of the character over which the control signals K decline gradually from the maximum value, e.g. 1, to 0 to produce a soft edge between the character F and the background matte B. As is well known, this so-called soft edge keying is employed to reduce aliasing which would otherwise arise between character and background. The maximum value of K will be less than 1 where a foreground image F is to be combined transparently with the background matte B. Thus the coefficient K in the above expression for V may have values in the range:

$$0 \leq K \leq 1$$

and it will be understood that similar soft edging will also appear in the external key signal α. In the accompanying drawings FIG. 1(A) and 1(B) together illustrate a character generator or source of the above described form, conditioned to generate an output video as represented by the above expression for V and also to generate the above mentioned external key α. All the Figures in the drawings are in the form of schematic functional diagrams in which different circuits elements are represented by blocks identified by functional symbols denoting the nature of the respective circuit elements. Specific explanation of individual functional units in the drawings is considered to be unnecessary for an understanding of the invention by those possessed of the appropriate skills.

Returning to FIG. 1(A) it will be appreciated that where K=0 pixels in the video image V will relate solely to the matte background B, where K=1 pixels in the video image V will relate solely to the foreground character F and that for pixels within the soft edges, where K is between 1 and 0, the output video V will include a contribution both from F and from the background B. In the special case where the background matte is black of value B=0, then the term B(1−K) will remain 0 regardless of the value of K, but the term F·K will diminish with K at the soft edges, thereby "darkening" the character, in effect increasing the contribution from black. It will also be appreciated from FIG. 1(B) that the value of α will track that of K, being non-zero where K is non-zero.

The external key α is used by external circuitry to key the video signal V output from the source into video signals representing a picture which may be regarded as arbitrary external background Bg. In this way a resultant picture R is produced comprising the background picture Bg and the foreground character F.

The external keying of the video V into the arbitrary external background Bg has hitherto usually been performed by another linear interpolation process as illustrated in FIG. 1(c) to produce the result:

$$R = \alpha V + Bg(1-\alpha)$$

Bearing in mind that from equation (1) hereinabove V = F·K+B(1−K) then the above equation for R shows that any contribution of the original background matte B in the signal V is multiplied by α. As mentioned hereinabove pixels within the soft edges are darkened towards black by the keying performed within the character source. In other words pixels in the soft edge output from the character source include an inseparable contribution from the black background of the matte. Therefore, the result signal R from the external interpolator includes the black background contribution in the soft edges thereof in addition to the external background Bg and this black contribution is therefore a spurious signal which may be seen as halos or shadows in the result image R. While these unwanted artifacts are usually feint they are nevertheless visible and can be disturbing. Similar problems can occur in other systems where two or more keying operations are required over the same area of a picture, for example in systems such as described in commonly assigned British Patent No. 2,113,950 (corresponding U.S. Pat. No. 4,602,286), or in systems in which different foreground objects can be internally keyed over two copies of the same background picture and an output produced by internally cross fading between one stamped copy and the other.

SUMMARY OF THE INVENTION

The object of the present invention is to reduce the problem of spurious signals such as illustrated above. According to one aspect of the present invention there is provided an image processing system in which first image data, representing at least one foreground image keyed to a portion of a first background in accordance with respective keying data, is combined with second image data, representing a second background, to produce data defining a combined image comprising said at least one foreground image keyed to a portion of said second background, the system being arranged such that the second image data is weighted by control data derived from said keying data before being combined with the first image data such that data representing the first background is replaced by the second image data.

According to another aspect of the invention there is provided a keying system for television image processing, the system comprising: a source of first video signals V representing a foreground object F keyed over a first background B; a source of second video signals representing an arbitrary background Bg; a source of key signals ($\alpha$) for keying the foreground object over the arbitrary background Bg; and a keying circuit responsive to said first and second video signals and said key signals to produce the result $$R = V + Bg(1-\alpha).$$

On the condition that:
$$V = FK + B(1-K) \text{ as above} \quad (1)$$

$B = 0$; and $$\alpha = K, \quad (2)$$

the above result R is:

$$R = FK + Bg(1-K)$$

which yields the required blend for soft edging between the foreground and the arbitrary background, Bg, with no contribution in the Result from the background B. That is to say, the first background B is replaced by the new arbitrary background Bg in such a way as to avoid the introduction of spurious artifacts such as halos or shadows in the resultant image. According to another aspect of the invention there is provided an image processing system comprising a first data source for supplying first image data representing a first image formed from at least one foreground image keyed to a first background image by interpolation in accordance with at least one respective first interpolation coefficient and for supplying a second interpolation coefficient derived from the or each first interpolation coefficient, and a divider for dividing the first image data by the second interpolation coefficient.

In a further aspect the invention provides a method of processing image data, the method comprising supplying first image data representing a first image formed form first image data representing at least one foreground image keyed to a first background image by interpolation in accordance with at least one respective first interpolation coefficient, deriving a second interpolation coefficient from the or each first interpolation coefficient, and dividing the first image data by the second interpolation coefficient. The above and further features of the invention are set forth with particularity in the appended claims and together with advantages thereof will become clearer from consideration of the following detailed description of exemplary embodiments of the invention given with reference to the accompanying drawings.

DETAILED DESCRIPTION

Further reference will now be made to FIGS. 2(A) to 5 of the accompanying drawings, which illustrate several different exemplary embodiments of the invention.

Figure 1A:
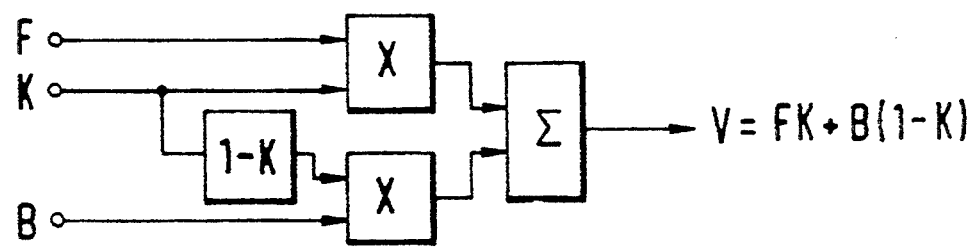
FIG. 1(A) and 1(B) illustrate a simple character generator and FIG. 1(C) illustrates a prior art external keying process as previously discussed hereinabove.
Figure 1B:
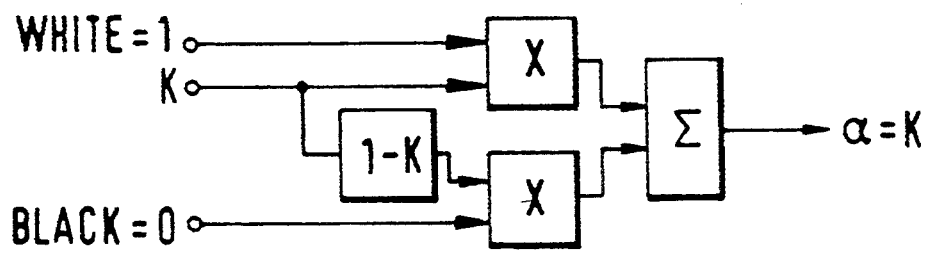
Figure 1C:
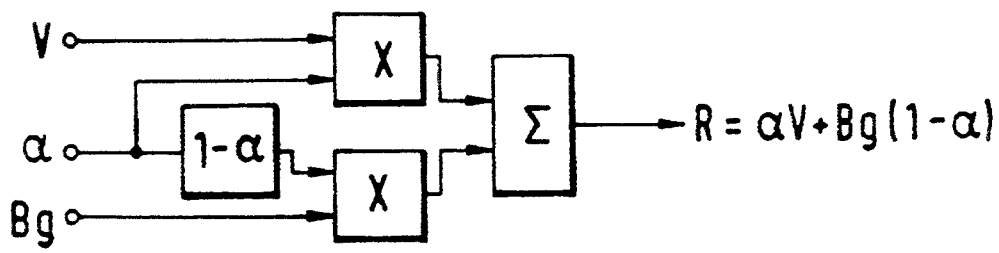
Figure 2A:
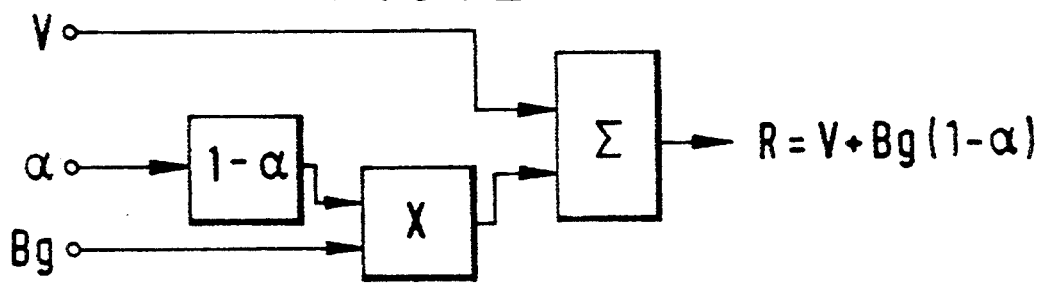
FIGS. 2(A), 2(B) and 2(C) illustrate a simple external keying system according to the present invention.

Turning first to FIG. 2(A), there is illustrated a system including a simple external or so-called downstream keying circuit according to the invention. The keying circuit of FIG. 2(A) operates on the video V output from the character source of Figure 1(A) under control of the key $\alpha$ output from the source shown in FIG. 1(B). There is a second video input in FIG. 2(A) namely a picture which can be regarded as an external arbitrary background Bg. It will be noted that in the downstream keying circuit of FIG. 2(A) there is no multiplying circuit in the input path for V, as there would be if the keying circuit were a linear interpolating circuit such as used hitherto and illustrated in FIG. 1(C) of the accompanying drawings. The Result which is output from the FIG. 2(A) downstream keyer is given by the equations:

$$R = V + Bg(1-\alpha)$$

$$\text{but } V = F.K + B(1-K) \quad (1)$$

and if $B = 0$ in equations (1), then substituting for V and $\alpha$ gives
$$R = FK + Bg(1-K).$$

That is to say, the result R output from the external keyer circuit to FIG. 2(A) is the foreground F keyed onto the external background Bg with no contribution from the original background B, which is the desired result.

Figure 2B:
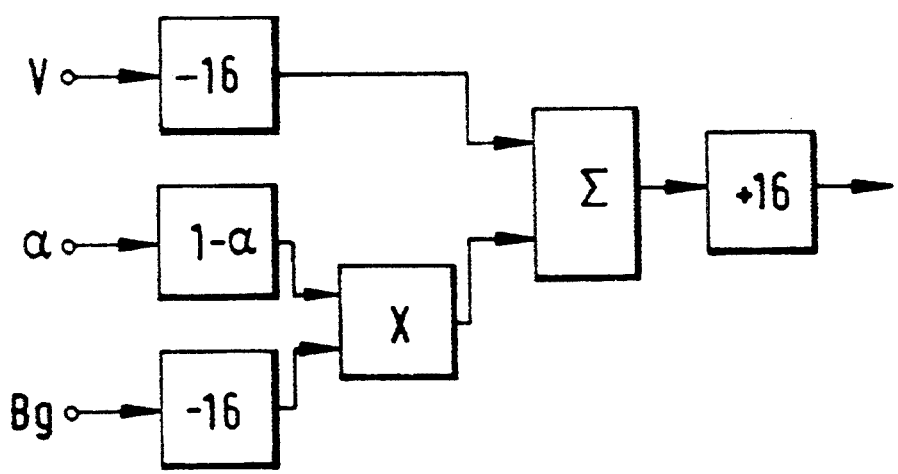
Figure 2C:
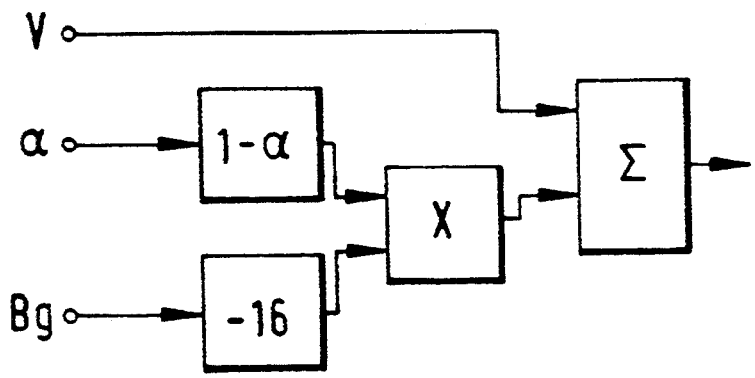

The condition that $B = 0$ implies that the "internal" background B in the video represented by the first video V signal is black matte. However, the CCIR specification for broadcast television signals specifies a luminance value 16 for black, and the second video signals representing the "external" arbitrary background might have black equal to sixteen in the scale of luminance signal values. In this event as illustrated in FIG. 2(B) of the accompanying drawings the black "offset" value of 16 would, in practice, be subtracted from both video signals V and Bg before applying them to the keying circuit, and would then be re-added to the Result. The circuit of FIG. 2(B) can be simplified to the circuit of FIG. 2(C).

Figure 3A:
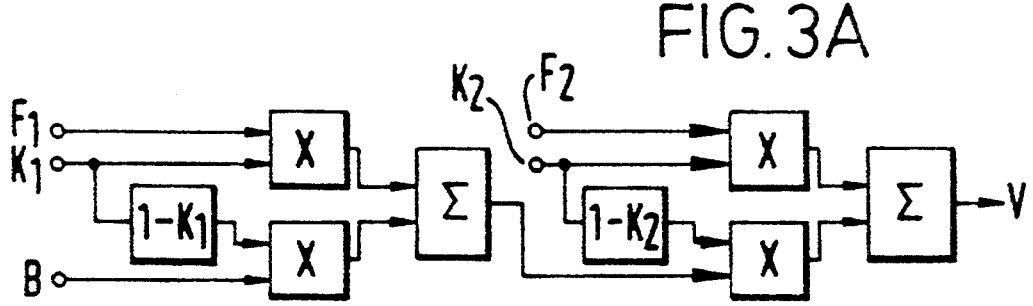
FIGS. 3(A), 3(B) and 3(C) illustrate a system including an external keyer for keying overlapped foreground objects onto the same background.
Figure 3B:
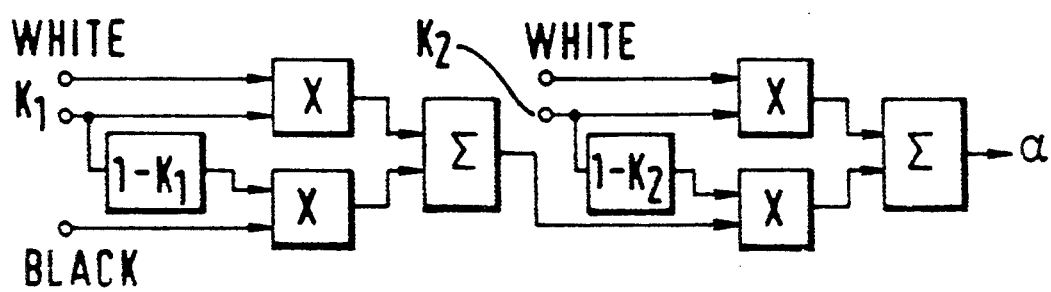
Figure 3C:
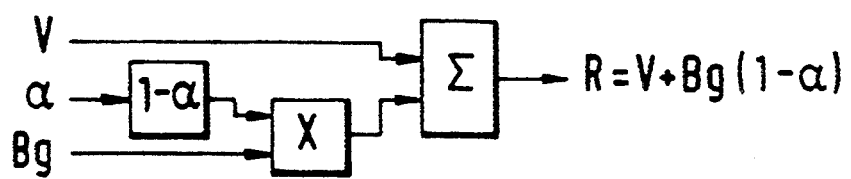

The invention would usually be applied to color television signals in digital form comprising different channels for different color components e.g. YUV or RGB. In this specification the description is confined to one channel, assumed to be the Y channel of a YUV system. For such a system the Y component to represent black has the value 16 (in the scale 0–255), as already discussed. For U and V components, the CCIR specification prescribes the value 128 (again on the scale 0 to 255) for zero chroma, and appropriate measures for dealing with the offset are required in the U and V channels also. Similar considerations apply to the generation of the external keying signal $\alpha$ from the internal key signals K. FIGS. 3(A), 3(B) and 3(C) illustrate a system for keying overlapping foreground objects F1 and F2 onto the same background B, followed by subsequent keying of the output over an external arbitrary background Bg. FIG. 3(A) shows the circuit components for keying F1 and F2 and B, FIG. 3(B) shows the circuit components for generating the external key $\alpha$, while FIG. 3(C) shows the external keying circuit. The video output from FIG. 3(A) is represented by:

$$V = [F_1 K_1 + B(1 - K_1)](1 - K_2) + F_2 K_2 \quad (3)$$

$$= B(1 - K_1)(1 - K_2) + F_1 K_1 (1 - K_2) + F_2 K_2.$$

The key signal output from FIG. 3(B) is represented by:

$$\alpha = K_1(1 - K_2) + K_2.$$

It will be noted that $K_1$ is the only output from the first of the two multiplying stages in FIG. 3(B) when the video signal for black is B=0.

It will also be noted that the external or downstream keyer circuit of FIG. 3(C) is exactly the same as that shown in FIG. 2(A) and that similar considerations regarding the offset values of black as discussed hereinabove in relation to FIGS. 2(B) and (C). Since the FIG. 3(C) downstream keyer is the same as that in FIG. 2(A) it follows that the result R of the external keying operation performed in the FIG. 3(C) circuit is again represented by the equation:

$$R = V + Bg(1\alpha).$$

If B=0 in equation (3) then substituting:

$$R = F_1 K_1 (1 - K_2) + F_2 K_2 + Bg(1 - [K_1(1 - K_2) + K_2])$$

$$= F_1 K_1 (1 - K_2) + F_2 K_2 + Bg(1 - K_1 - K_2 + K_1 K_2)$$

$$= F_1 K_1 (1 - K_2) + F_2 K_2 + Bg(1 - K_1)(1 - K_2).$$

It should be noted that $Bg(1-K_1)(1-K_2)$ is the same term as was applied to B in equation (3) and is therefore free from contributions from the original background B, as required.

The arrangement illustrated by FIGS. 3(A), 3(B) and 3(C) can be used in an image composition system such as shown in commonly assigned British Patent 2,113,950 and U.S. Pat. No. 4,602,286.

Figure 4A:
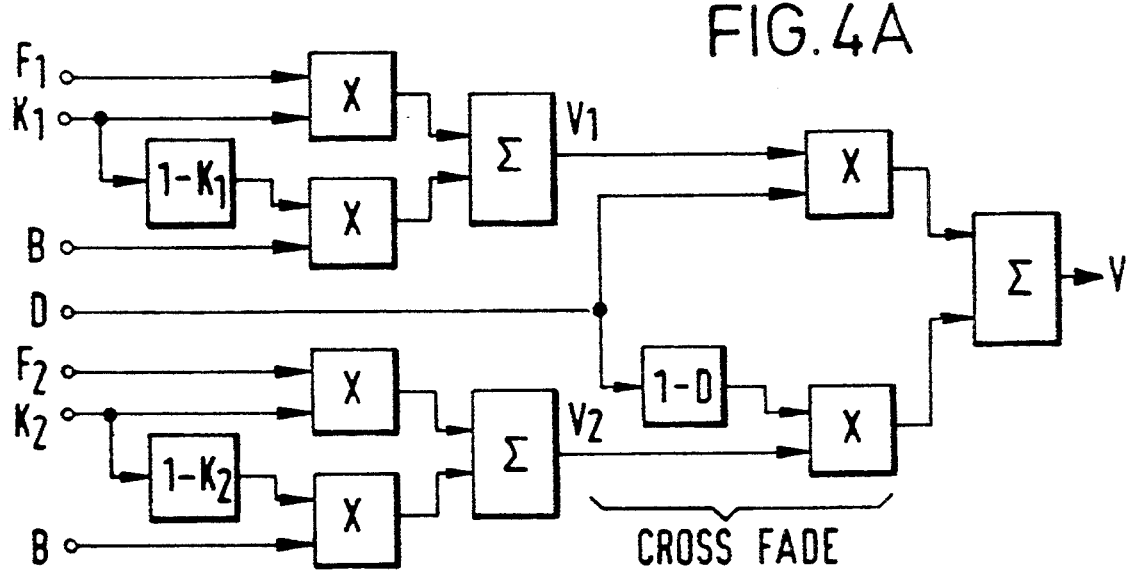
FIG. 4 illustrates a system including an external keyer for keying two different foreground objects over respective copies of the same background and for cross fading between the two.
Figure 4B:
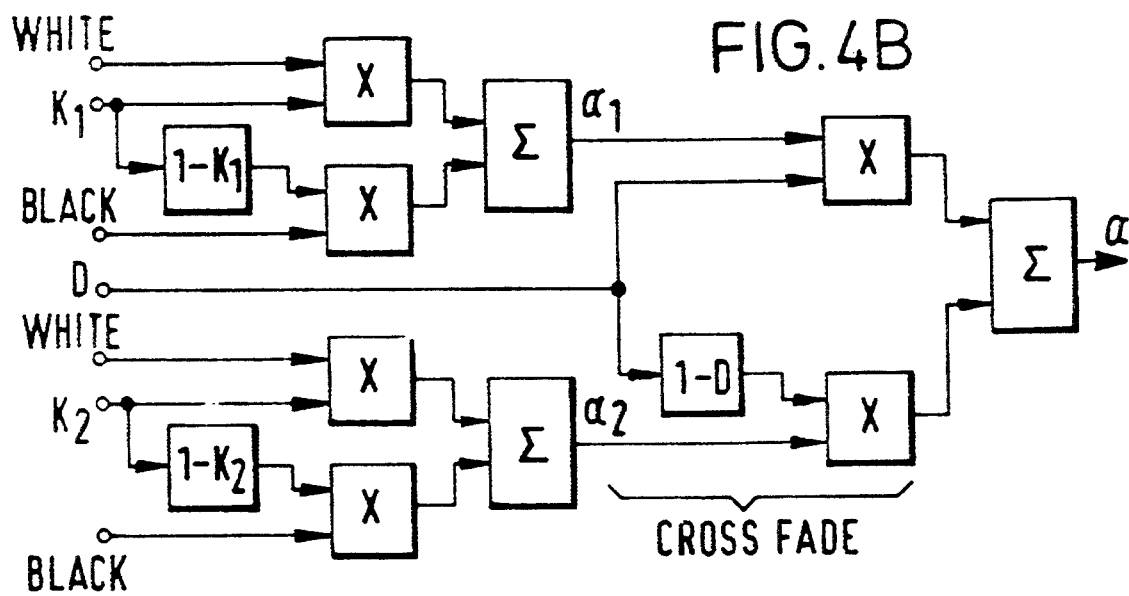
Figure 4C:
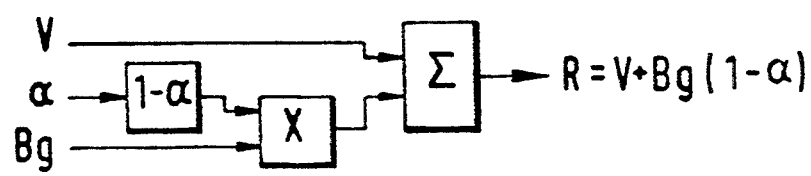

FIGS. 4(A), 4(B) and 4(C) illustrate an arrangement for keying two different foreground objects F1 and F2 over two respective copies of the same background B in which arrangement the two results are cross faded, as are the two internal keys. Subsequently the cross faded foregrounds F1 and F2 are keyed by a downstream keyer into an external arbitrary background Bg. The initial background B is again assumed to be a black matte and thus to have a value notionally of B=0. As an illustration of the use to which the form of the invention may be put, the foreground objects F1 and F2 may be symbols denoting different sports, for example a cricket bat and tennis racket keyed into the top left hand corner of a black matte. The external background Bg may be a sports commentary of a cricket match and a tennis match, with the commentator switching at will between the two. At any one time the appropriate symbol is keyed into the external background Bg, and when the commentator switches from one match to the other, the two symbols F1 and F2 are cross faded. As represented in FIG. 4(A), cross fading of the foregrounds F1 and F2 can be affected under control of the operation by a dissolve signal D, which determines the "profile" of the fade. The FIG. 4(A) arrangement provides an output video V, while FIG. 4(B) shows the circuit arrangement for producing the corresponding external key $\alpha$ derived from the two internal keys $K_1$ and $K_2$. The expressions for the signals V and $\alpha$ are given by the following expression:

$$V = [F_1 K_1 + B(1 - K_1)] D + [F_2 K_2 + B(1 - K_2)](1 - D) \quad (5)$$

$$= B[D(K_2 - K_1) + (1 - K_2)] + F_1 K_1 D + F_2 K_2 (1 - D)$$

$$\alpha = K_1 D + K_2 (1 - D) \quad (6)$$

Subsequently V and $\alpha$ are applied to an external downstream keying circuit as illustrated in FIG. 4(C). Again it should be noted that the circuit of FIG. 4(C) is identical to that of FIG. 2(A) and similar considerations regarding offset values apply. When V and $\alpha$ are applied to the external keying circuit shown in FIG. 4(C) together with the external background Bg, the following expresses the result R output therefrom.

From equations (6)

$$(1 - \alpha) = 1 - (K_1 D + K_2 (1 - D)) \quad (7)$$

$$= 1 - K_1 D - K_2 + K_2 D$$

$$= D(K_2 - K_1) + (1 - K_2)$$

If B is 0 in equation 5 then $$V = F_1 K_1 D + F_2 K_2 (1 - D)$$

Now R=V+BG (1−$\alpha$), and so substituting both for V (with B=B=0) and for (1 −$\alpha$) gives:
Result=Bg
$[D(K_2-K_1)+(1-K_2)]+F_1K_1D+F_2K_2(1-D)$ This is the same term for Bg as was applied to B in equation 5 and is therefore the required result.

That is to say, in the result R the original internal background B is replaced with the external background Bg with no residual contribution from the original background.

Figure 5:
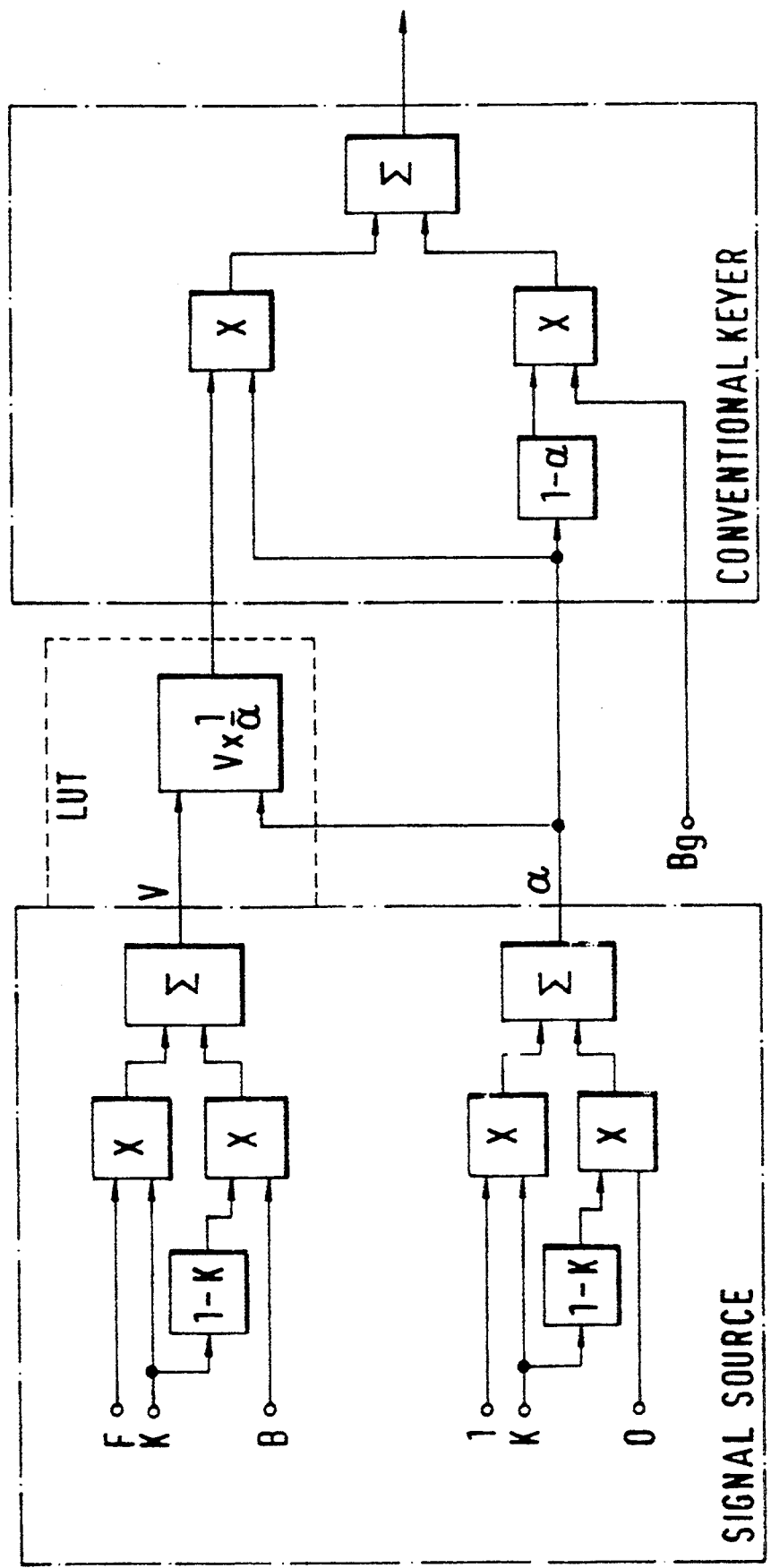
FIG. 5 illustrates a system in which a foreground image is pre-processed before being delivered externally to a conventional keying circuit.

In FIGS. 2(A) through 4(C) various video signals V, which have previously been created by keying one or more foreground signals F onto a background matte signal B, are supplied to a downstream keyer together with an external keying signal α derived from the internal keying signals K used to produce the video signal. The derived external keying signal α is used to weight an arbitrary background signal Bg in the downstream keyer and the weighted background signal is then combined with the video signal V, unweighted, to produce the desired result. An alternative arrangement allows a conventional keyer similar to that shown in FIG. 1(C) of the accompanying drawings to be used. The keyer shown in FIG. 1(C) is a widely available apparatus and by using such a keyer the costs of the system can be kept to a reasonable level. The alternative arrangement is shown in FIG. 5 of the accompanying drawings and comprises a conventional source, such as a system available from the assignee hereof under the trade name CYPHER, i.e., a character generator which provides a video signal V and a keying signal α similar to those signals already discussed hereinabove in relation to FIGS. 3(A), 3(B), 4(A) and 4(B) of the drawings, and a conventional keyer. The video signal comprises a foreground F keyed onto a black matte background B by a key K. The output video V and the internally derived external key α are output to a look up table LUT which divides V by α. In setting up the look up table consideration must be given to the black offset in the foreground data F and the key data (see FIGS. 2(B) and 2(C)). The output from the look up table is delivered together with the external key α and an arbitrary background Bg to the conventional keyer which keys the α-divided video V onto the background using the key α. It will be noted that net effect of the look up table is to precondition the foreground signal F such that it is supplied unchanged to the conventional keyer. Once inside the keyer the foreground signal is multiplied by the external key α and added to the background weighted by $(1-\alpha)$ to produce the result $R=V-Bg(1-\alpha)$ as before. Thus, the look up table performs the inverse operation to that performed by the multipliers within the source. Thus, the look up table, which may be a stand-alone unit but preferably is built into the source, serves to precompensate the foreground video V so that it is not processed for a second time by the same key data in the conventional keyer thereby ensuring that the background matte B is replaced completely by the external background Bg in the conventional keyer without the introduction of unwanted artifacts.

In each of the above described embodiments the video signal is created by keying one or two foreground signals over a black matte background using a respective internal key for the or each foreground signal. An external key signal is derived from the internal keys and is subsequently used to combine the video signal with an external background signal of arbitrary content. The embodiments are not limited to the use of a video signal created from only one or two foreground signals and can be applied equally to a video signal formed from multiple foreground images so long as the keying signal for each foreground signal is available for use in deriving the external keying signal.

Having thus described the present invention by reference to preferred embodiments it is to be understood that the embodiments in question are exemplary only and that modifications and variations such as will occur to those possessed of appropriate knowledge and skills may be made without departure from the spirit and scope of the invention as set forth in the appended claims and equivalents thereof.

I claim:

1. An image processing system comprising:
   a first source of image data in which a first keyer is provided for keying first foreground data representing a first foreground image with first background data representing a first background image of a matte of uniform color in accordance with a first interpolation coefficient to produce first keyed image data representing the first foreground image keyed to the first background image for output as first image data from the first source;
   an interpolation coefficient generator for generating in dependence on said first interpolation coefficient a generated interpolation coefficient for output from the first source in association with said first image data;
   a second source of image data for providing second image data representing a second image;
   a multiplier for weighting the second image data in dependence on said generated interpolation coefficient to produce weighted second image data; and
   a combiner for combining said first image data output from said first source with said weighted second image data from said multiplier to produce combined image data which is substantially artifact-free and represents the foreground image in combination with the second image.

2. An image processing system as claimed in claim 1, wherein said interpolation coefficient generator for generating said generated interpolation coefficient is provided in said first source.

3. An image processing system as claimed in claim 2, wherein the interpolation coefficient generator in said first source is adapted to generate said generated interpolation coefficient by applying said first interpolation coefficient to data representing image white and data representing image black.

4. An image processing system as claimed in claim 3, wherein said first source is provided with a second keyer for keying second foreground data representing a second foreground image with said first keyed image data in accordance with a second interpolation coefficient to produce image data representing the first foreground image and the second foreground image keyed to the first background image for output as said first image data, and said interpolation coefficient generator is adapted to generate said generated interpolation coefficient in dependence on said first interpolation coefficient and said second interpolation coefficient.

5. An image processing system as claimed in claim 4, wherein the interpolation coefficient generator is adapted to generate said generated interpolation coefficient by applying said first interpolation coefficient to data representing image white and data representing image black in order to produce intermediate data and thereafter by applying said second interpolation coefficient to said data representing image white and said intermediate data.

6. An image processing system as claimed in claim 2, wherein said first background image is a black matte.

7. An image processing system as claimed in claim 2, further comprising offset means for applying an offset value to the second image data so that image black in said second image data is represented by a value corresponding to zero.

8. An image processing system as claimed in claim 7, wherein said offset means is adapted to apply the offset value to the first image data output from said first source so that image black said first image data is represented by a value corresponding to zero, and is further adapted to remove the offset value from said combined image data from said combiner.

9. An image processing system as claimed in claim 2, wherein said first source is provided with:
- a second keyer for keying second foreground data representing a second foreground image with second background data representing a second background image of a matte of uniform color in accordance with second interpolation coefficient to produce second keyed image data representing the second foreground image keyed to the second background image.
- a user variable source of dissolve data; and
- a cross fader connected to receive said first keyed image data from said first keyer and said second keyed image data from said second keyer for combining said first keyed image data and said second keyed image data in dependence on said dissolve data to produce the first image data representing a cross fade between the image represented by the first keyed image data and the image represented by the second keyed image data.

10. An image processing system as claimed in claim 9, wherein the interpolation coefficient generator in said first source is adapted to generate said generated interpolation coefficient by:
- applying said first interpolation coefficient to data representing image white and data representing image black in order to produce first intermediate data;
- applying said second interpolation coefficient to said data representing image white and image black to produce second intermediate data; and
- combining said first and said second intermediate data in dependence on said dissolve data.

11. An image processing system as claimed in claim 1, wherein the interpolation coefficient generator in said first source is adapted to generate said generated interpolation coefficient by applying said first interpolation coefficient to data representing image white and data representing image black.

12. An image processing system as claimed in claim 11, wherein said first source is provided with a second keyer for keying second foreground data representing a second foreground image with said first keyed image data in accordance with a second interpolation coefficient to produce image data representing the first foreground image and the second foreground image keyed to the first background image for output as said first image data, and said interpolation coefficient generator is adapted to generate said generated interpolation coefficient in dependence on said first interpolation coefficient and said second interpolation coefficient.

13. An image processing system as claimed in claim 12, wherein the interpolation coefficient generator is adapted to generate said generated interpolation coefficient by applying said first interpolation coefficient to data representing image white and data representing image black in order to produce intermediate data and thereafter by applying said second interpolation coefficient to said data representing image white and said intermediate data.

14. An image processing system as claimed in claim 1, wherein said first background image is a black matte.

15. An image processing system as claimed in claim 1, further comprising offset means for applying an offset value to the second image data so that image black in said second image data is represented by a value corresponding to zero.

16. An image processing system as claimed in claim 15, wherein said offset means is adapted to apply the offset value to the first image data output from said first source so that image black in said first image data is represented by a value corresponding to zero, and is further adapted to remove the offset value from said combined image data from said combiner.

17. An image processing system as claimed in claim 1, wherein said first source is provided with:
- a second keyer for keying second foreground data representing a second foreground image with second background data representing a second background image of a matte of uniform color in accordance with second keying data to produce second keyed image data representing the second foreground image keyed to the second background image;
- a user variable source of dissolve data; and
- a cross fader connected to receive said first keyed image data from said first keyer and said second keyed image data from said second keyer for combining said first keyed image data and said second keyed image data in dependence on said dissolve data to produce the first image data representing a cross fade between the image represented by the first keyed image data and the image represented second keyed image data.

18. An image processing system as claimed in claim 17, wherein the interpolation coefficient generator in said first source is adapted to generate said generated interpolation coefficient by:
- applying said first interpolation coefficient to data representing image white and data representing image black in order to produce first intermediate data;
- applying said second interpolation coefficient to said data representing image white and image black to produce second intermediate data; and
- combining said first and said second intermediate data in dependence on said dissolve data.

19. An image processing system as claimed in claim 1, further comprising a further multiplier for weighting said first image data in dependence on said generated interpolation coefficient; and a divider for dividing said first image data by said generated interpolation coefficient before the first image data is input to the further multiplier.

20. An image processing system as claimed in claim 19, wherein said divider comprises a look up table.

21. A method of processing image data, the method comprising:
- keying first foreground data representing a first foreground image with first background data representing a first background image of a matte of uniform color in accordance with a first interpolation coefficient to produce first keyed image data representing the first foreground image keyed to the first background image for use as first image data;
- generating in dependence on said first interpolation coefficient a generated interpolation coefficient associated with the first image data;
- providing second image data representing a second image;
- weighting the second image data in dependence on said generated interpolation coefficient to produce weighted second image data; and combining said first image data with said weighted second image data to produce combined image data which is substantially artifact-free and represents the first foreground image in combination with the second image.

22. The method as claimed in claim 21, wherein the generated interpolation coefficient is generated by applying said first interpolation coefficient to data representing image white and data representing image black.

23. The method as claimed in claim 22, wherein said first background image is a black matte.

24. The method as claimed in claim 22, further comprising applying an offset value to the second image data so that image black in said second image data is represented by a value corresponding to zero.

25. The method as claimed in claim 24, wherein the offset value is applied to the first image data so that image black in said first image data is represented by a value corresponding to zero, and the offset value is subsequently removed from said combined image data.

26. The method as claimed in claim 22, further comprising:
 keying second foreground data representing a second foreground image with said first keyed image data in accordance with a second interpolation coefficient to produce image data representing the first foreground image and the second foreground image keyed to the first background image for use as said first image data; and
 generating said generated interpolation coefficient in dependence on said first interpolation coefficient and said second interpolation coefficient.

27. The method as claimed in claim 26, further comprising generating said generated interpolation coefficient by applying said first interpolation coefficient to data representing image white and data representing image black in order to produce intermediate data and thereafter by applying said second interpolation coefficient to said data representing image white and said intermediate data.

28. The method as claimed in claim 21, further comprising:
 keying second foreground data representing a second foreground image with second background data representing a second background image of a matte of uniform color in accordance with a second interpolation coefficient to produce second keyed image data representing the second foreground image keyed to the second background image;
 generating variable dissolve data; and
 combining said first keyed image data and said second keyed image data in dependence on said dissolve data to produce combined image data for use as said first image data representing a cross fade between the image represented by the first keyed image data and the image represented by the second keyed image data.

29. The method as claimed in claim 28, wherein the generated interpolation coefficient is generated by:
 applying said first interpolating coefficient to data representing image white and data representing image black in order to produce first intermediate data;
 applying said second interpolation coefficient to said data representing image white and image black to produce second intermediate data; and
 combining said first and said second intermediate data in dependence on said dissolve data.

30. The method as claimed in claim 21, wherein said first background image is a black matte.

31. The method as claimed in claim 21, further comprising applying an offset value to the second image data so that image black in said second image data is represented by a value corresponding to zero.

32. The method as claimed in claim 31, wherein the offset value is applied to the first image data so that image black in said first image data is represented by a value corresponding to zero, and the offset value is subsequently removed from said combined image data.

33. An image processing system comprising:
 first interpolation circuit means for keying data comprising a first foreground image over data comprising a background matte of uniform color by employing a first interpolating coefficient;
 second interpolation circuit means for deriving a second interpolation coefficient from said first interpolation coefficient;
 a divider for dividing the data output of the first interpolation circuit means by said second interpolation coefficient; and
 third interpolation circuit means for keying the output data of the divider over data representing a further background image by employing said second interpolation coefficient.

34. An image processing system as claimed in claim 33, wherein said data comprising a foreground image, said data comprising a background matte and said data representing a further background image comprise digital data.

35. An image processing system as claimed in claim 34, wherein said divider comprises a look up table.

36. An image processing system as claimed in claim 33, wherein background matte is black and said second interpolation coefficient is derived from said first interpolation coefficient by applying said first interpolation coefficient to data representing image white and data representing image black.

37. An image processing system as claimed in claim 33, wherein said first second and third interpolation circuit means comprise linear interpolation circuit means.

38. An image processing method comprising:
 keying data comprising a foreground image over data comprising a background matte of uniform color by employing a first interpolation coefficient to produce keyed image data;
 deriving a second interpolation coefficient from said first interpolation coefficient;
 dividing the keyed image data by said second interpolation coefficient to produce divided image data; and
 keying the divided image data with data representing a further background image by employing said second interpolation coefficient.

39. An image processing method as claimed in claim 38, wherein said data comprising a foreground image, said data comprising a background matte and said representing a further background image comprise digital data.

40. An image processing method as claimed in claim 33, wherein background matte is black and said second interpolation coefficient is derived from said first interpolation coefficient by applying said first interpolation coefficient to data representing image white and data representing image black.

41. An image processing method as claimed in claim 38, wherein said keying data, said deriving a second interpolation coefficient, and said keying the divided image data are each effected by way of a respective linear interpolation.

* * * * *